United States Patent [19]
Williams

[11] 3,957,249
[45] May 18, 1976

[54] TRAILER JACK FOOT
[76] Inventor: Hugh M. Williams, 6308 Commodore, Oklahoma City, Okla. 73132
[22] Filed: Sept. 29, 1975
[21] Appl. No.: 617,361

[52] U.S. Cl. .............................. 254/45; 254/133 R; 280/766; 280/477
[51] Int. Cl.² .......................................... B66F 7/26
[58] Field of Search ........ 254/45, 133, 134, DIG. 1, 254/DIG. 4; 280/150.5, 475, 477

[56] References Cited
UNITED STATES PATENTS
| | | | |
|---|---|---|---|
| 2,852,229 | 9/1958 | Gross | 254/134 |
| 3,008,730 | 11/1961 | Lisota | 280/150.5 |
| 3,740,077 | 6/1973 | Williams | 280/477 |
| 3,807,767 | 4/1974 | Moline | 280/477 |

Primary Examiner—Al Lawrence Smith
Assistant Examiner—Robert C. Watson
Attorney, Agent, or Firm—Dunlap & Codding

[57] ABSTRACT

A trailer jack foot for use with a trailer jack having a vertically extending housing and an extensible member, the trailer jack foot comprising a horizontally extending flange on the housing, a horizontally extending flange on the lower end portion of the extensible member, and a jack extender attachable to the flange on the extension member to extend the effective length of the jack, and, alternately, to the flange on the housing for storage.

8 Claims, 2 Drawing Figures

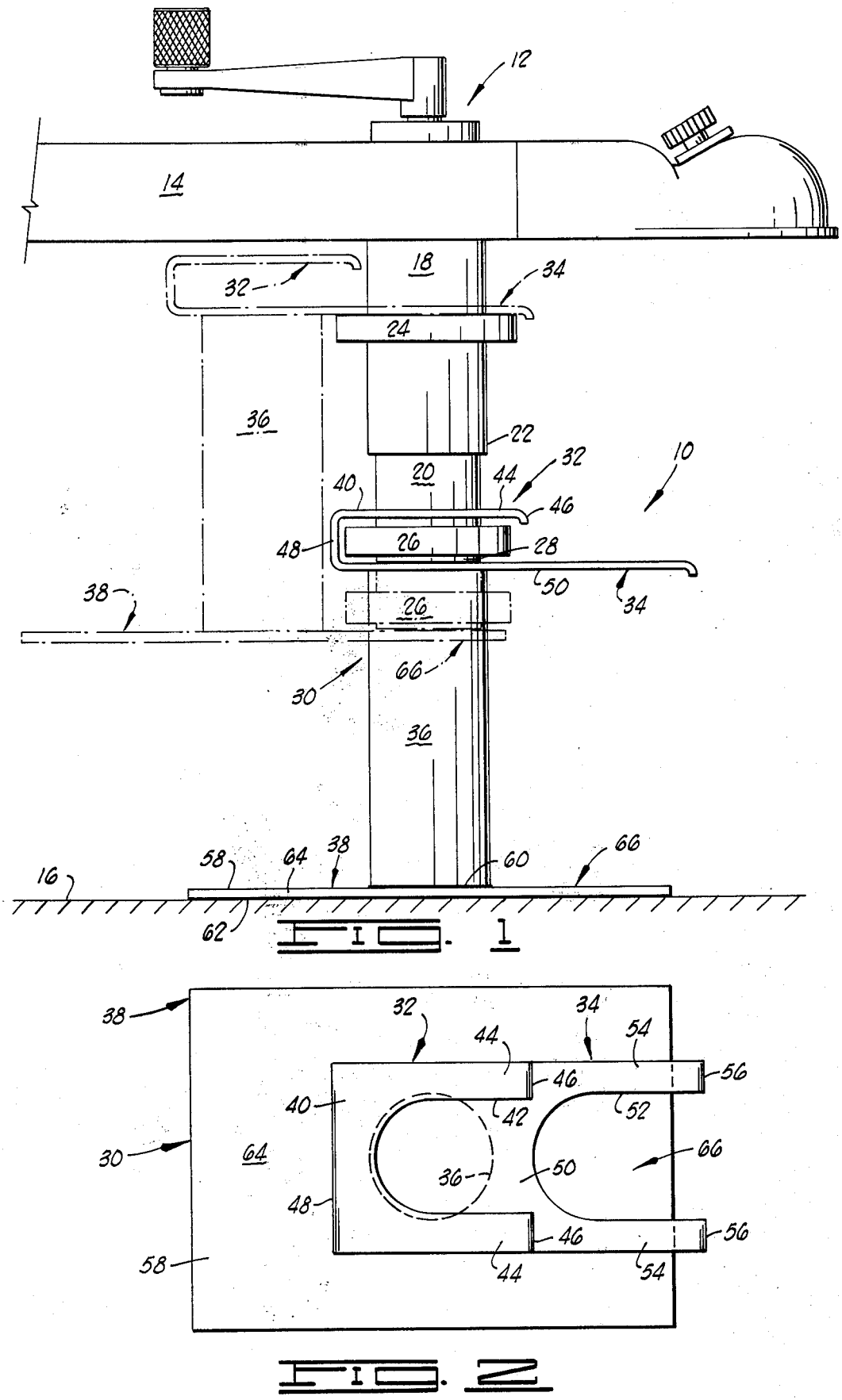

TRAILER JACK FOOT

BACKGROUND OF THE INVENTION

1. Field of the Invention

The invention relates generally to improvements in trailer jack feet and, more particularly, but not by way of limitation, to a trailer jack foot attachable to the extensible member of a trailer jack to extend the effective length of said jack, and, alternately, to the jack housing for storage.

2. Description of the Prior Art

In general, the prior art trailer jacks have been provided with a wheel unit on the bottom thereof to facilitate the positioning of the trailer tongue. However, such units are often unsatisfactory for use for one or more of a number of reasons: the wheel exhibits a marked tendency to roll on a inclined surface thereby requiring additional apparatus to assure a safe operating position; the wheel unit tends to sink rapidly in soft ground due to the small weight bearing surface area, thereby requiring additional apparatus to prevent such occurrence; the wheel unit necessarily employs various moving parts which require periodic maintenance and are subject to breakdown; and such wheel units are often required to be removed through the use of various tools when it is desired to transport the trailer, although some units such as that shown in U.S. Pat. No. 3,008,730 do incorporate a self-storing feature. Although some trailer jack feet, such as that shown in U.S. Pat. No. 3,807,767, do not employ a wheel unit, such units are generally subject to one or more of the above listed disadvantages and are particularly subject to being misplaced due to the absence of a self-storing feature.

SUMMARY OF THE INVENTION

An object of this invention is to provide a trailer jack foot for extending the effective length of a trailer jack while providing security against rolling.

Another object of this invention is to provide a trailer jack foot having no moving parts and which may be attached to a trailer jack to extend the length thereof without the use of any tools.

A further object of this invention is to provide a trailer jack foot having a self-storing feature such that the trailer jack foot may be attached to a trailer jack to extend the effective length of the jack, and alternately, to the jack housing for storage.

A still further object of the invention is to provide a trailer jack foot which is simple and economical in construction and operation.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a side elevational view of the trailer jack foot of the present invention in operative relationship with a tongue-mounted trailer jack, with the storage position of the jack extender shown in phantom.

FIG. 2 is a top view of the jack extender of the present invention.

DESCRIPTION OF THE PREFERRED EMBODIMENT

Referring to the drawings in general, and to FIG. 1 in particular, shown therein and referred to by the reference numeral 10 is a trailer jack foot constructed in accordance with the present invention. The trailer jack foot 10 is designed to be used in combination with a trailer jack 12 mounted on a trailer tongue 14 for supporting a portion of the weight of a trailer (not shown) on the ground 16. The trailer jack 12 is shown generally as having a vertically extending housing 18 and an extensible member 20 movable up and down through the lower end 22 of the housing 18. The trailer jack foot 10 is comprised generally of a horizontally extending flange 24 on the housing 18, a horizontally extending flange 26 on the lower end portion 28 of the extensible member 20, and a jack extender 30.

The flange 24 may be formed as an integral portion of the housing 18 or preferably, as a separate element attachable to the housing 18 by any of various suitable connecting means. In a similar manner, the flange 26 may be either an integral portion of the extensible member 20 or as a separate element attachable to the lower end portion 28 of the extensible member 20 by suitable means. The positioning of the flanges 24 and 26 relative to the housing 18 and the extensible member 20, respectively, will be described in greater detail hereinbelow.

The jack extender 30 is comprised generally of first and second hangers 32 and 34, respectively, a vertically extending support portion 36 and a foot portion 38. The first hanger 32 engages the flange 26 on the extensible member 20 when the jack extender 30 is positioned to extend the length of the jack 12 as shown in FIG. 1. More particularly, the first hanger 32 is preferably a horizontally extending plate 40 having a substantially U-shaped slot 42 therein the width of which is at least as large as the diameter of the extensible member 20. The slot 42 defines a pair of substantially parallel tines 44. In the preferred embodiment, the tines 44 have a length at least as great as the diameter of the extensible member 20 with the ends 46 thereof being curved downwardly so as to extend downwardly over the edge of the flange 26 when the jack extender 30 is positioned to extend the length of the jack 12.

The second hanger 34 is connected to the first hanger 32 by a connecting portion 48, but is positioned below and extends to one side of the first hanger 32 so as to engage the flange 24 on the housing 18 when the jack extender 30 is in a storage position as shown in phantom in FIG. 1. More particularly, the second hanger 34 is preferably a horizontally extending plate 50 having a substantially U-shaped slot 52 therein the width of which is at least as large as the diameter of the housing 18. The slot 52 defines a pair of substantially parallel tines 54. In the preferred embodiment, the tines 54 have a length at least as great as the diameter of the housing 18 with the ends 56 thereof being curved downwardly so as to extend downwardly over the edge of the flange 24 when the jack extender 30 is in the storage position. Thus, the first and second hangers 32 and 34, respectively, preferably form the ends of a horizontally disposed, J-shaped plate.

The support portion 36 is connected to, and extends vertically downward from, the first and second hangers 32 and 34, respectively, substantially in line with the extensible member 30 when the jack extender 30 is positioned to extend the length of the jack 12. More particularly, the support portion 36 is connected to the first and second hangers 32 and 34, respectively, so as to be vertically aligned with the slot 42 in the first hanger 32 to assure vertical stability. In the preferred embodiment, the support portion 36 is formed from a length of pipe, the dimensions of which may be varied as desired.

The foot portion 38 is connected by the upper surface 58 thereof to the lower end 60 of the support portion 36 by suitable means such as welding. The lower surface 62 of the foot portion 38 engages the ground 16 when the jack extender 30 is positioned to extend the length of the jack 12. The upper surface 58 of the foot portion 38 engages the lower end 28 of the extensible member 20 when the jack extender 30 is in the storage position. In the preferred embodiment, the foot portion 38 consists of a horizontally extending plate 64 having a portion 66 vertically aligned with at least a portion of the extensible member 20 when the jack extender 30 is in the storage position.

OPERATION OF THE PREFERRED EMBODIMENT

Assuming that the flanges 24 and 26 are formed as separate elements, the flange 24 should be positioned around the housing 18, and the flange 26 positioned around, and connected to, the lower end portion 28 of the extensible member 20. With the extensible member 20 retracted into the housing 18 until the flange 26 substantially abuts the lower end 22 of the housing 18, the flange 24 should be connected to the housing 18 such that the foot portion 38 will extend horizontally a relatively short distance beneath the lower end 28 of the extensible member 20 when the jack extender 30 is in the storage position substantially as shown in phantom in FIG. 1. More particularly, the flange 24 should be connected to the housing 18 in a vertical position which allows the foot portion 38 to extend horizontally beneath the lower end 28 of the extensible member 20 when the second hanger 34 has the housing 18 positioned in the slot 52 therein and the ends 56 of the tines 54 extend downwardly over the edge of the flange 24. Thus it is clear that the jack extender 30 will be retained in the storage position when the extensible member 20 has been extended downwardly until the lower end 28 thereof engages the upper surface 58 of the foot portion 38, since the downwardly curved ends 56 cooperate with the foot portion 38 to prevent the disengagement of the second hanger 34 from the flange 24.

To position the jack extender 30 to extend the length of the jack 12, the jack extender 30 should be removed from the storage position by retracting the extensible member 20 and disengaging the second hanger 34 from the flange 24. The jack extender 30 should then be positioned with the extensible member 20 in the slot 42 in the first hanger 32 with the ends 46 of the tines 44 extending downwardly over the edges of the flange 26. The downwardly curving ends 46 of the tines 44 substantially prevent the inadvertant disengagement of the first hanger 32 from the flange 26 while the jack extender 30 is being moved into engagement with the ground 16.

The extensible member 20 may then be extended downwardly until the lower surface 62 of the foot portion 38 engages the ground 16. Further downward extension of the extensible member 20 moves the lower end 28 of the extensible member 20 into engagement with the second hanger 34 thereby allowing a portion of the weight of the trailer to be transferred from the extensible member 20 to the ground 16 via the second hanger 34, the support portion 36 and the foot portion 38. If desired, a suitable protrusion may be provided on the upper surface of the second hanger 34 to prevent the extensible member 20 from "creeping" out of the slot 42. The first hanger 32 may be easily disengaged from the flange 26 once the weight of the trailer has been removed from the extensible member 20 and the extensible member 20 retracted a sufficient distance into the housing 18.

Changes may be made in the construction and the arrangement of the parts or the elements of the preferred embodiment as disclosed herein without departing from the spirit and scope of the invention as defined in the following claims.

What is claimed is:

1. In combination with a trailer jack for supporting a portion of the weight of a trailer on the ground, the jack having a vertically extending housing and an extensible member movable up and down through the lower end of the housing:
    a horizontally extending flange on the housing;
    a horizontally extending flange on the lower end portion of the extensible member; and,
    a jack extender attachable to the extensible member above the flange thereon to extend the effective length of the jack, and, alternately, to the jack housing above the flange thereon for storage, comprising:
        a first hanger engaging the flange on the extensible member when the jack extender is positioned to extend the length of the jack;
        a second hanger connected to, but positioned below and extending to one side of, the first hanger and engaging the flange on the housing when the jack extender is in a storage position;
        a support portion connected to, and, extending vertically downward from, the first and second hangers substantially in line with the extensible member when the jack extender is positioned to extend the length of the jack; and
        foot means on the lower end of the support portion for engaging the ground when the jack extender is positioned to extend the length of the jack and for engaging the lower end of the extensible member when the jack extender is in a storage position.

2. The apparatus of claim 1 wherein the first hanger is further characterized as a horizontally extending plate having a substantially U-shaped slot therein the width of which is at least as large as the diameter of the extensible member, the slot defining a pair of substantially parallel tines.

3. The apparatus of claim 2 wherein the tines are further characterized as having a length at least as great as the diameter of the extensible member with the ends thereof being curved downwardly so as to extend downwardly over the edge of the flange on the extensible member when the jack extender is positioned to extend the length of the jack.

4. The apparatus of claim 1 wherein the second hanger is further characterized as a horizontally extending plate having a substantially U-shaped slot therein the width of which is at least as large as the diameter of the housing, the slot defining a pair of substantially parallel tines.

5. The apparatus of claim 4 wherein the tines are further characterized as having a length at least as great as the diameter of the housing with the ends thereof being curved downwardly so as to extend downwardly over the edge of the flange on the housing when the jack extender is in a storage position.

6. The apparatus of claim 1 wherein the support portion is further characterized as a length of pipe.

7. The apparatus of claim 1 wherein the foot means is further characterized as a horizontally extending plate having a portion vertically aligned with at least a portion of the extensible member when the jack extender is in a storage position.

8. The apparatus of claim 1 wherein the first and second hangers form the ends of a horizontally disposed, J-shaped plate.

* * * * *